(12) United States Patent
Ohtsu et al.

(10) Patent No.: US 6,382,739 B1
(45) Date of Patent: May 7, 2002

(54) BRAKE CONTROL SYSTEM

(75) Inventors: Nobuyuki Ohtsu; Toru Kojima; Yoshiyuki Izu, all of Kanagawa (JP)

(73) Assignees: Unisia Jecs Corporation, Atsugi; Nissan Motor Co., Ltd., Yokohama, both of (JP)

( * ) Notice: Subject to any disclaimer, the term of this patent is extended or adjusted under 35 U.S.C. 154(b) by 0 days.

(21) Appl. No.: 09/577,666

(22) Filed: May 25, 2000

(30) Foreign Application Priority Data

May 25, 1999 (JP) .......................................... 11-145219

(51) Int. Cl.$^7$ ................................................ B60T 8/88
(52) U.S. Cl. .................................. 303/122.04; 303/168
(58) Field of Search ..................... 303/122.04, 122.05, 303/168, 170, 160

(56) References Cited

U.S. PATENT DOCUMENTS

| | | | | | |
|---|---|---|---|---|---|
| 5,130,933 A | * | 7/1992 | Kitano | ........................ | 364/487 |
| 5,510,707 A | * | 4/1996 | Caron | ........................ | 324/166 |
| 5,542,756 A | * | 8/1996 | Lukevich et al. | ...... | 303/122.05 |
| 5,757,641 A | * | 5/1998 | Minto | .................... | 303/122.07 |
| 5,923,163 A | * | 7/1999 | Stuible et al. | ......... | 303/122.05 |
| 6,092,879 A | * | 7/2000 | Kornhaas et al. | ...... | 303/122.04 |
| 6,102,492 A | * | 8/2000 | Dichle et al. | ............ | 303/113.5 |
| 6,126,250 A | * | 10/2000 | Gutoehrlein et al. | ... | 303/122.03 |

FOREIGN PATENT DOCUMENTS

| JP | 10147232 A | * | 2/1998 |
|---|---|---|---|
| JP | 10-147232 | | 6/1998 |

* cited by examiner

Primary Examiner—Christopher P. Schwartz
Assistant Examiner—Robert A. Siconolfi
(74) Attorney, Agent, or Firm—Foley & Lardner

(57) ABSTRACT

There is provided a brake control system for carrying out ABS control in which the brake hydraulic pressure is reduced by a brake unit in accordance with a difference between a pseudo vehicle body speed and each of wheel speeds so as to prevent wheel locking. A control unit is configured to detect an abnormality in output of wheel speed sensors, and to determine the pseudo vehicle body speed in accordance with outputs from the wheel sensors except the wheel determined as being abnormal. The control unit determines whether the abnormal wheel is a drive wheel or a non-drive wheel, and to reset the determination of abnormality under conditions differentiated in accordance with whether the abnormal wheel is a drive wheel or a non-drive wheel.

16 Claims, 9 Drawing Sheets

BRAKE CONTROL SYSTEM

BACKGROUND OF THE INVENTION

The present invention relates to a brake control system which carries out the so-called ABS control, that is, the brake pressure is controlled so as to prevent wheels from being locked upon braking, and in particular, to a brake control system incorporating a processing function for coping with an abnormality due to disturbance caused by noise imposed on an output from a wheel speed sensor or by inferior installation.

In a brake control system which carries out ABS control, in which a pseudo vehicle body speed is estimated from wheel speeds of wheels, and the brake hydraulic pressure is decreased, held or increased in accordance with the pseudo vehicle speed and the wheel speed so as to prevent any of the wheels from being locked upon braking, in order to allow ensuring of steering ability and running stability to consist with shortening of braking distance.

In such a brake control device, it is important to detect a wheel speed with a high degree of accuracy in order to carry out the above-mentioned ABS control, that is, if a wheel speed sensor becomes abnormal, normal ABS control cannot be carried. Thus, there has been proposed a device for carrying out control coping with an abnormality whenever a wheel speed sensor becomes abnormal.

Such a conventional brake control device is disclosed in Japanese Laid-Open Patent Publication No. H10-147232.

The above-mentioned conventional device includes an abnormality detecting means for detecting an abnormality in each of wheel speed sensors for wheels, and accordingly, if any abnormality is detected, an estimated vehicle speed calculating means calculates an estimated vehicle body speed from wheel speeds of those of the wheels which exclude a wheel as to which the abnormality is detected, and this abnormality detecting means is adapted to determine that a wheel speed calculated in the present control cycle for a given wheel is abnormal, if the vehicle speed calculated in the present control cycle becomes higher than a vehicle speed calculated in a previous control cycle for one and the same wheel, by a value exceeding a set value $\alpha$, and if it becomes higher than the estimated vehicle body speed by a value exceeding a set value $\beta$.

Accordingly, in this conventional brake control device, even though noise is continuously imposed on an output from a wheel speed sensor, the estimated vehicle body speed does not exceed an actual vehicle body speed, and accordingly, it is possible to eliminate occurrence of such disadvantages that unnecessary ABS control is carried out so as to effect unwanted pressure decrease, that erroneous determination is made, that is, an abnormality is determined when a vehicle speed is recovered from a large skid, thereby it is possible to prevent occurrence of pressure decrease caused by unwanted ABS control.

SUMMARY OF THE INVENTION

As mentioned above, in the conventional brake control device, even though the degree of control accuracy can be enhanced, since a wheel speed is merely compared with a value which is obtained by adding a previous speed value with the set value $\alpha$ or $\beta$ in order to determine whether an abnormality occurs or not, there is a possibility that occurrence of an abnormality is determined if a drive wheel spins so as to exceed the value, and accordingly, the control coping with the abnormality is sustained even after the spin of the drive wheel vanishes, thereby lowering the control accuracy.

The present invention is devised in view of the above-mentioned problems, and accordingly an object of the present invention is to provide an arrangement capable of detecting an abnormality properly in the case of an abnormality caused by noise imposed on an output from a wheel speed sensor, and discriminating, from such an abnormality, a condition of drive wheel spin, thereby enhancing the control quality.

According to the present invention, a brake control system comprises: a brake unit for reducing brake hydraulic pressures in wheel cylinders for braking wheels of a vehicle, independent from one another; wheel speed sensors for detecting wheels speeds of the wheels, respectively; pseudo vehicle body speed producing means for determining a pseudo vehicle body speed in accordance with outputs of the wheel speed sensors; ABS control means for carrying out ABS control to prevent wheel locking on braking by decreasing a brake hydraulic pressure with the brake unit in accordance with a difference between the pseudo vehicle body speed and each of the wheel speeds; and abnormality determining means for detecting an abnormality in the outputs of the wheel speed sensors, and for causing the pseudo vehicle body speed producing means to determine the pseudo vehicle body speed in accordance with the outputs from the wheel speed sensors, excepting the output of the wheel speed sensor if an abnormality is detected therein. The abnormality determining means comprises an abnormal wheel discriminating means for determining whether an abnormal wheel is a drive wheel or not, to differentiate conditions for resetting the determination of abnormality in dependence on whether the abnormal wheel is a drive wheel or a non-drive wheel.

DETAILED DESCRIPTION OF THE INVENTION

Figure 2:
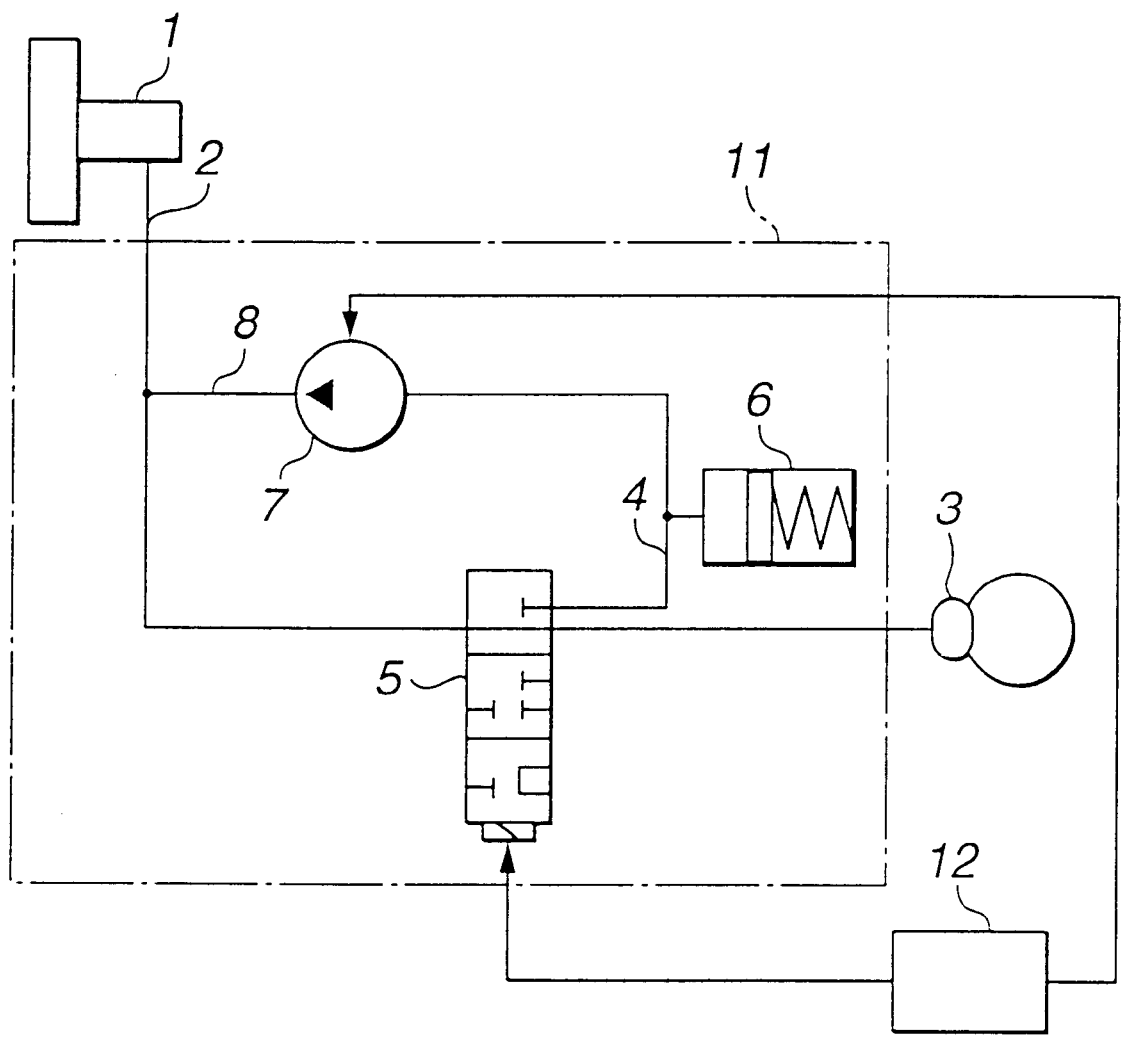
FIG. 2 is a view illustrating a hydraulic circuit in a brake control system according to the embodiment of the present invention.

Referring to FIG. 2 which is a configuration view illustrating an essential part of an embodiment of the present invention, there is a master brake cylinder 1 which is adapted to produce a hydraulic pressure when a driver which is not shown in the drawing depresses a brake pedal.

The master cylinder 1 is connected to a wheel cylinder 3 through a hydraulic brake circuit 2. Further, the brake circuit 2 incorporates therein a selector valve 5 which is changed over among a pressure increasing (boost-up) condition in which the upstream side (the master cylinder 1 side) of the brake circuit 2 is communicated with the downstream side (the wheel cylinder side) of the hydraulic circuit 2, a pressure decreasing (or reducing) condition in which brake fluid is relieved from the wheel cylinder into a drain circuit 4, and a pressure holding condition in which the brake circuit 2 is shut-off so as to hold a brake hydraulic pressure in the wheel cylinder 3. Accordingly, the hydraulic pressure in the wheel cylinder 2 can be optionally controlled by changing over the selector valve 5.

Further, the drain circuit 4 is incorporated therein with a reservoir 6 for reserving therein brake fluid. Further, a flowing (or circulating) circuit 8 is provided, connecting the reservoir 6 with the brake circuit 2 at a position upstream of the selector valve 5, and a pump 7 for feeding the brake fluid reserved in the reservoir 6 into the brake circuit 2 is provided in the flowing circuit 8.

Figure 1:
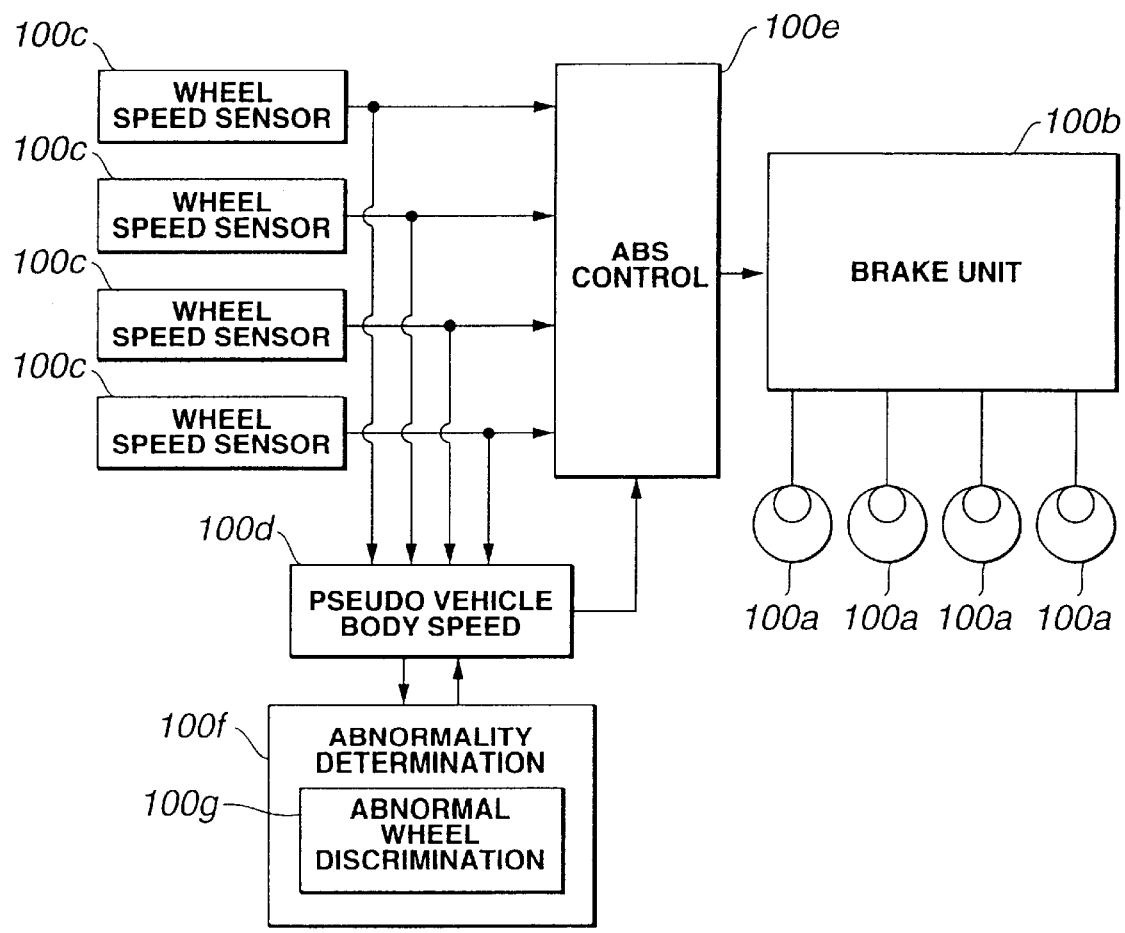
FIG. 1 is a block diagram illustrating a brake control system according to one embodiment of the present invention.
Figure 3:
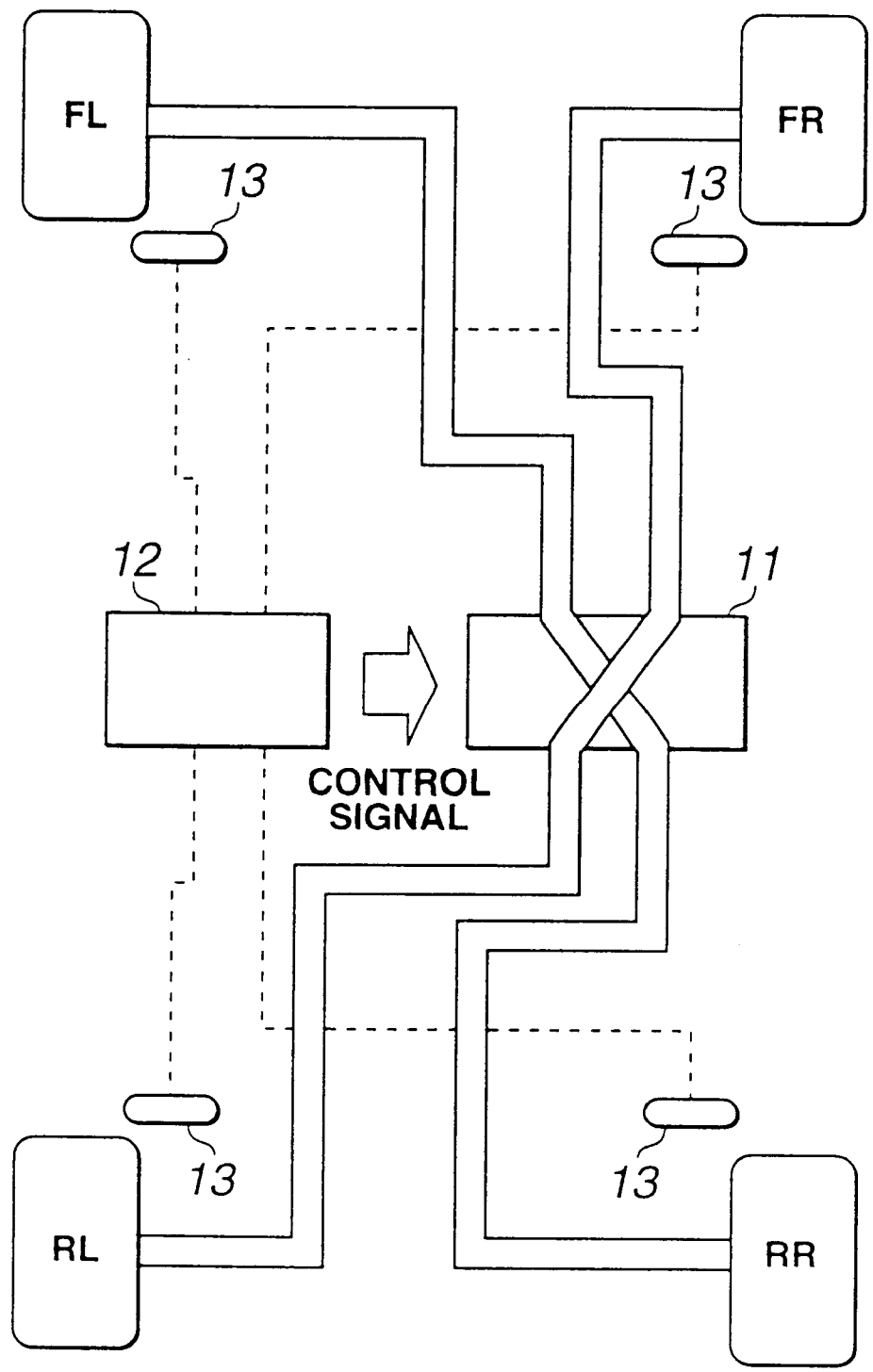
FIG. 3 is a schematic view illustrating the brake control system of the embodiment.

An arrangement in a zone surrounded by a one-dot chain line in FIG. 2, corresponds to an integral brake unit 11. It is noted that although the arrangement having only one wheel is shown in FIG. 1, the entire arrangement is, as shown in FIG. 3, such that the brake unit 11 can control brake pressures in wheel cylinders 3 (which is not shown in FIG. 3) for four wheels FR, FL, RR, RL, respectively. Incidentally, a vehicle in which the present embodiment is applied, is a rear wheel drive vehicle in which the rear wheels RR, RL are drive wheels.

The operations of the selector valve 5 and the pump 7 in the brake unit 11, are controlled by a control unit 12 which is connected with four wheel speed sensors 13, as input means, for detecting rotational speeds of the wheels FR, FL, RR and RL.

Next, explanation will be made of brake control in this embodiment.

Figure 4:
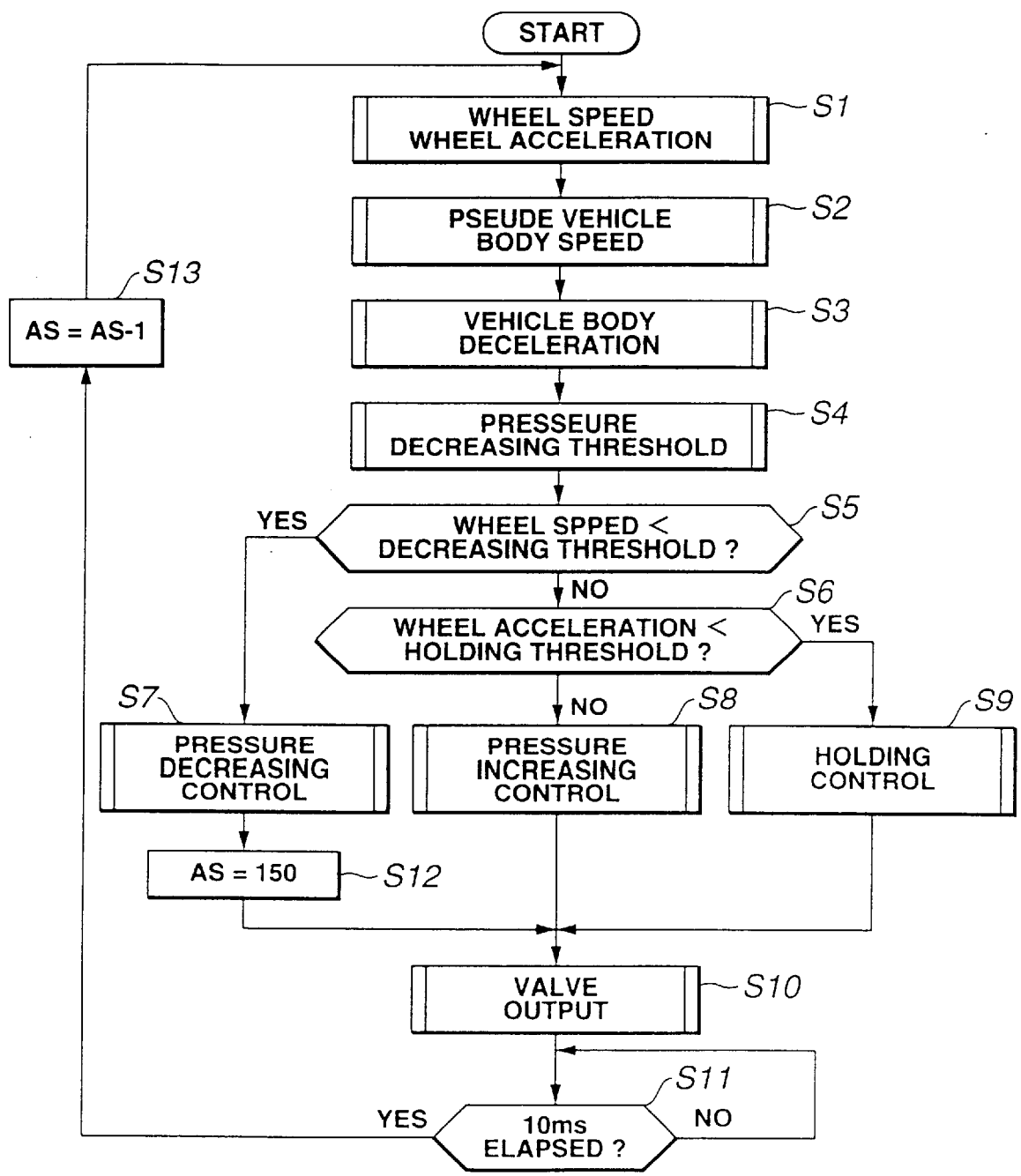
FIG. 4 is a flow chart illustrating a process of ABS control in the brake control system of the embodiment.

The brake control in this embodiment is adapted to carry out the so-called ABS control for controlling brake hydraulic pressure for each wheel in order to prevent the wheels from being locked upon braking. FIG. 4 shows a flow-chart for the ABS control.

The present brake control is carried out with a 10 msec cycle period. First, at step Si, a sensor frequency is obtained from a number ND of sensor pulses and a period TD from each wheel speed sensor 13, which are generated in every 10 msec. cycle period, and then a wheel speed Vw and a wheel acceleration ΔVw are calculated for each wheel. It is noted that in such a case that FR, FL, RR or RL is attached to the rear side of the reference mark Vw, it denotes a wheel speed of a particular one of the wheels FR, FL, RR, RL.

At step S2, a pseudo vehicle body speed Vi is calculated. This step S2 corresponds to a pseudo vehicle speed producing means. The calculation of the pseudo vehicle speed will be detailed later.

At step 3, a vehicle body deceleration ΔV is calculated from a rate of change of the pseudo vehicle speed Vi.

At step 4, a computation is carried out for obtaining a pressure decreasing (or reducing) threshold value λ1. The pressure reduction is carried when the wheel speed Vw becomes lower than this threshold value λ1. For example, this value can be obtained from the following formula in view of a select wheel speed Vfs which is highest among the wheel speeds of the four wheels:

$$\lambda 1 = A \cdot Vfs - B$$

where A, B are arbitrary coefficients (or parameters) which are set so that the pressure reducing threshold λ1 is set to a value which is lower than the select wheel speed Vfs by a certain degree and which can provide a slip rate suitable for obtaining a brake force.

At step S5, whether the wheel speed Vw is lower than the pressure reducing threshold value λ1 or not is determined. If it is lower than the pressure reducing threshold value λ1, control is transferred to step S7, at which the selector valve 5 is switched into the pressure reducing condition so as to carry out pressure reducing control for reducing the pressure in the wheel cylinder. Then, next at step S12, a timer AS for delivering an On-ABS control signal which indicates that the ABS control is in operation, is set at 150, for example. It is noted that in this pressure reducing control, the control signal is actually delivered to the selector valve 5 in a valve output process at step S10.

Further, if the answer of step S5 is NO (in the case in which Vw>λ1), control is transferred to step S6, at which it is determined whether the wheel acceleration ΔVw is equal to or smaller than a preset holding threshold value or not. If the wheel acceleration ΔVw is greater than the holding threshold value, it is estimated that the vehicle speed is recovered, and accordingly, at step S8, the pressure increase (boost-up) control is carried out (the selector valve 5 is changed over into the boost-up condition). Meanwhile, if the wheel acceleration ΔVw is not greater than the holding threshold value, control is transferred to step 9, and the holding control (the selector valve 5 is turned into the holding condition) is carried out. An output operation to the selector valve 5 in either the boost-up control at step 8 or the holding control at step 9 is performed at step 10.

At step 11, whether 10 msec. elapses or not is determined. If 10 msec. has elapsed, control is transferred to step S13, at which the count of the timer AS for the On-ABS control signal is decremented (or decreased by one).

Figure 5:
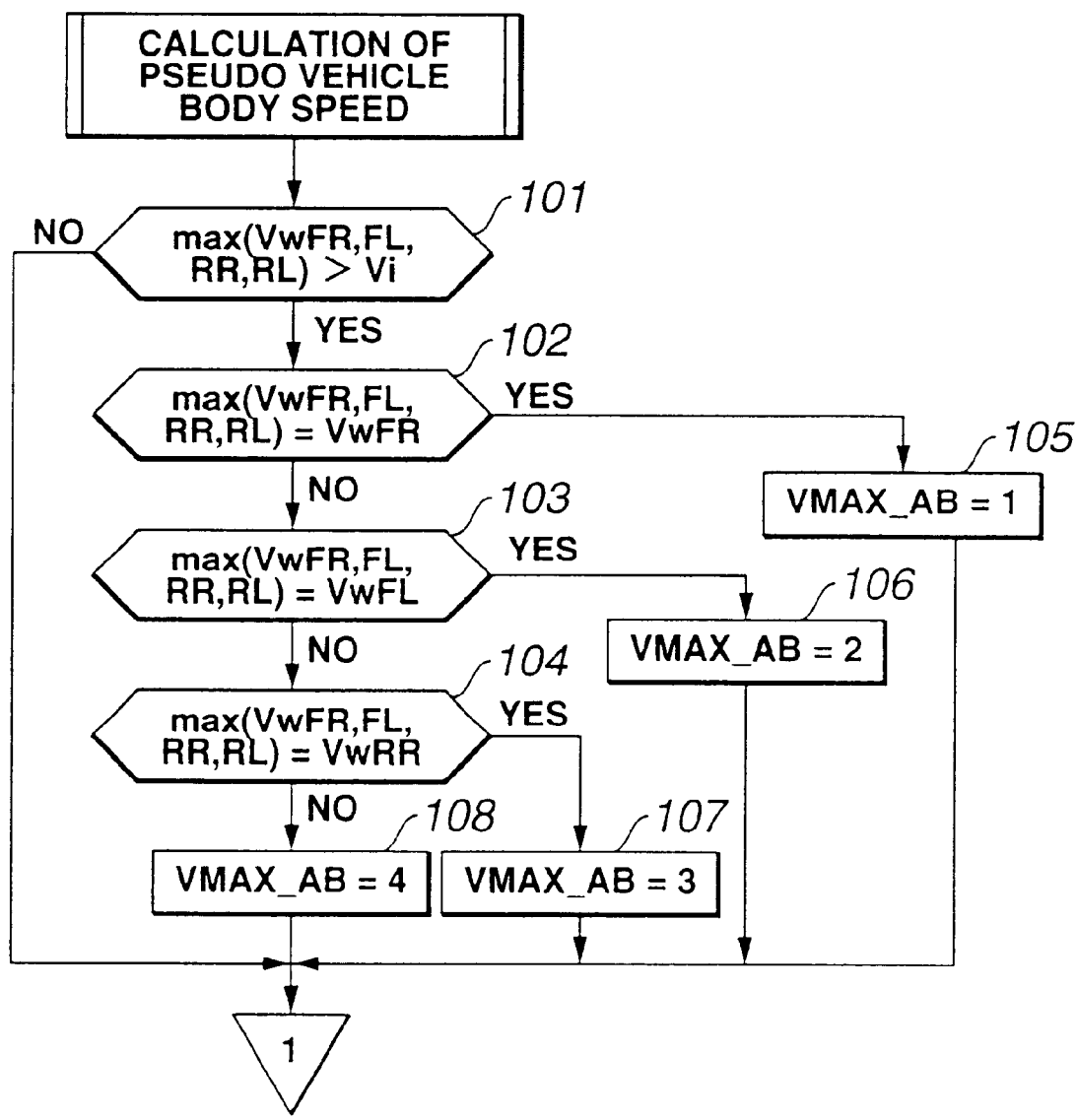
FIG. 5 is a flow chart illustrating a first section of a process of calculating a pseudo vehicle speed in the brake control system shown in FIG. 1.

Next, explanation will be made in detail of the calculation of the pseudo vehicle speed at step S2, with reference to flow-charts shown in FIGS. 5 to 7.

First, at step 101, it is determined whether or not an abnormal condition in which the highest value maxVw among the wheel speeds of the four wheels exceeds the pseudo vehicle speed Vi is present. If the answer of the step 101 is NO, that is, maxVw≦Vi (a normal condition), control is transferred directly to step 109. When, however, the answer of step 101 is YES, that is, maxVw>Vi (an abnormal condition), control is transferred to steps 102~104 to determine which one of the wheels exhibits an abnormal wheel speed. If the front right wheel FR is. an abnormal wheel exhibiting the abnormal wheel speed, the control unit 12 proceeds from step 102 to step 105, and sets an abnormal wheel flag VMAX_AB to one (VMAX_AB=1). If the abnormal wheel speed is the speed of the front left wheel FL, then the control unit 12 proceeds from step 103 to step 106, and sets the abnormal wheel flag to 2(VMAX_AB=2). If the rear right wheel RR is the abnormal wheel of the abnormal wheel speed, the control unit 12 proceeds from step 104 to step 107, and sets abnormal wheel flag to 3 (VMAX_AB=3). If the abnormal wheel is not any of these three wheels FR, FL and RR, but the rear left wheel RL is the abnormal wheel exhibiting the abnormal wheel speed, the control unit 12 proceeds from step 104 to step 108, and sets the abnormal wheel flag to 4 (VMAX_AB=4). The program section of step 101 to step 108 corresponds to an abnormal wheel determining means.

Figure 6:
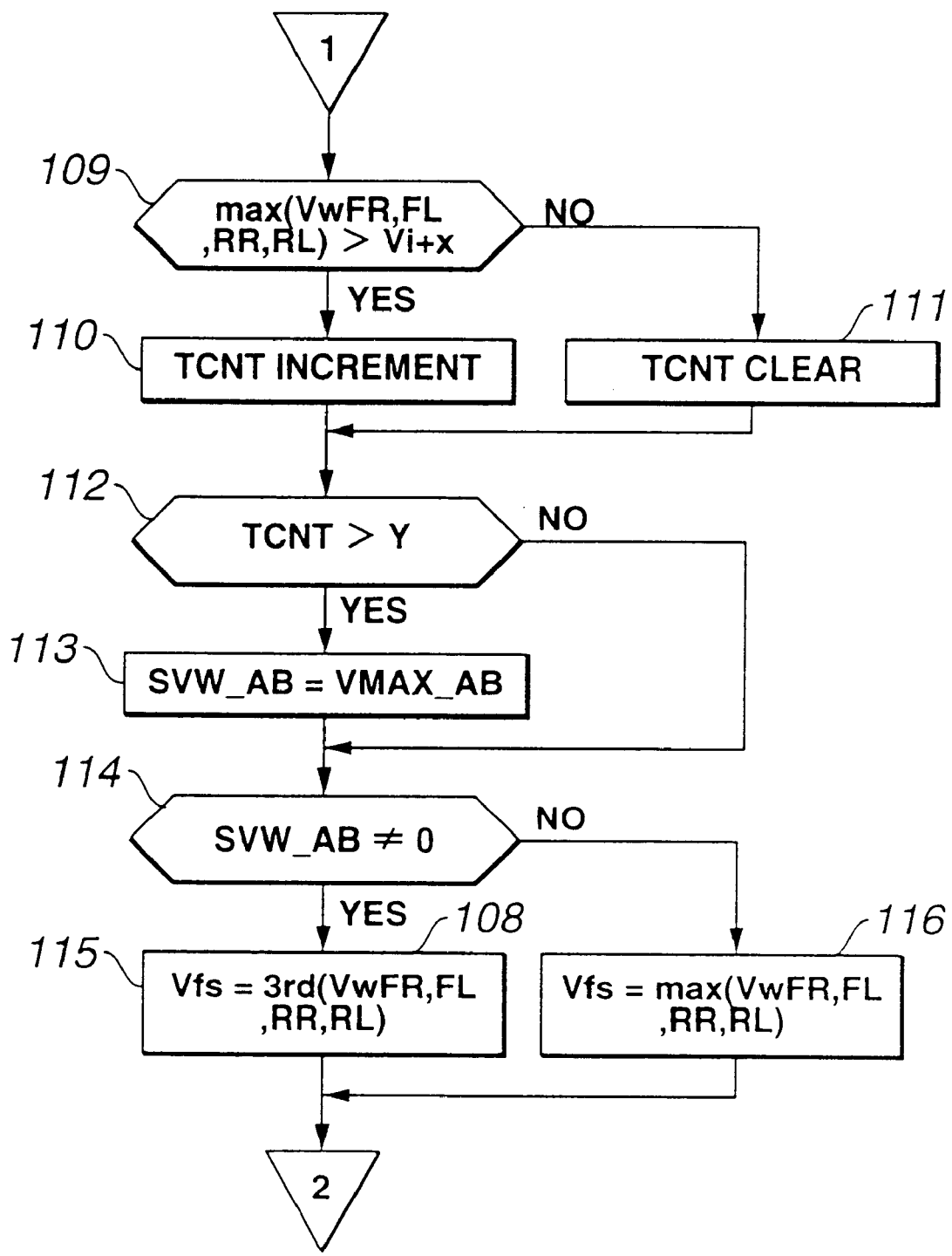
FIG. 6 is a flow chart illustrating a second section of the process of calculating the pseudo vehicle body speed in the brake control system of the embodiment.

Next, at step 109 shown in FIG. 6, it is determined whether the maximum wheel speed maxVw is greater than the pseudo vehicle speed Vi by a value exceeding a preset abnormality determining speed difference x, or not. If the answer is YES, that is, maxVw>Vi+x, the control unit 12 increments (or increase by one) on the count of the counter TCNT at step 110. If the answer of step 109 is NO, that is maxVw≦Vi+x, the counter TCNT is cleared at step 111. Thus, steps 109~S111 are designed to measure how long the abnormal condition, that is, maxVw>Vi +x, is continued, by counting with the counter TCNT.

At next step 112, whether the count on the counter TCNT exceeds a preset abnormal determining time Y or not is determined. If the count is greater than Y (TCNT >Y), , that is, if the abnormal condition of the sensor continues for a time exceeding the abnormal determining time Y, control is transferred to step 113, the value of the abnormal wheel flag VMAX_AB is set to an abnormality concluding signal SVW_AB. The program section of steps 109 to 113 corresponds to an abnormality determining means.

At step 114, whether the abnormal concluding signal SVW_AB is produced or not is determined (SVW_AB≈0). If SVW_AB is not equal to zero (in the case that an abnormal wheel speed is present), the control unit 12 proceeds from step 114 to step 115, and sets the select wheel speed Vfs to a third values 3rdVw among the four wheel speeds. That is, the select wheel speed Vfs is set equal to the highest one among the three wheel speeds Vw except the wheel which is abnormal. If no abnormality concluding signal SVW_AB is produced, the control unit 12 proceeds to step 116, as a normal course, and sets the select wheel speed Vfs to the maximum (or highest) value maxvw among the four wheel speeds.

Figure 7:
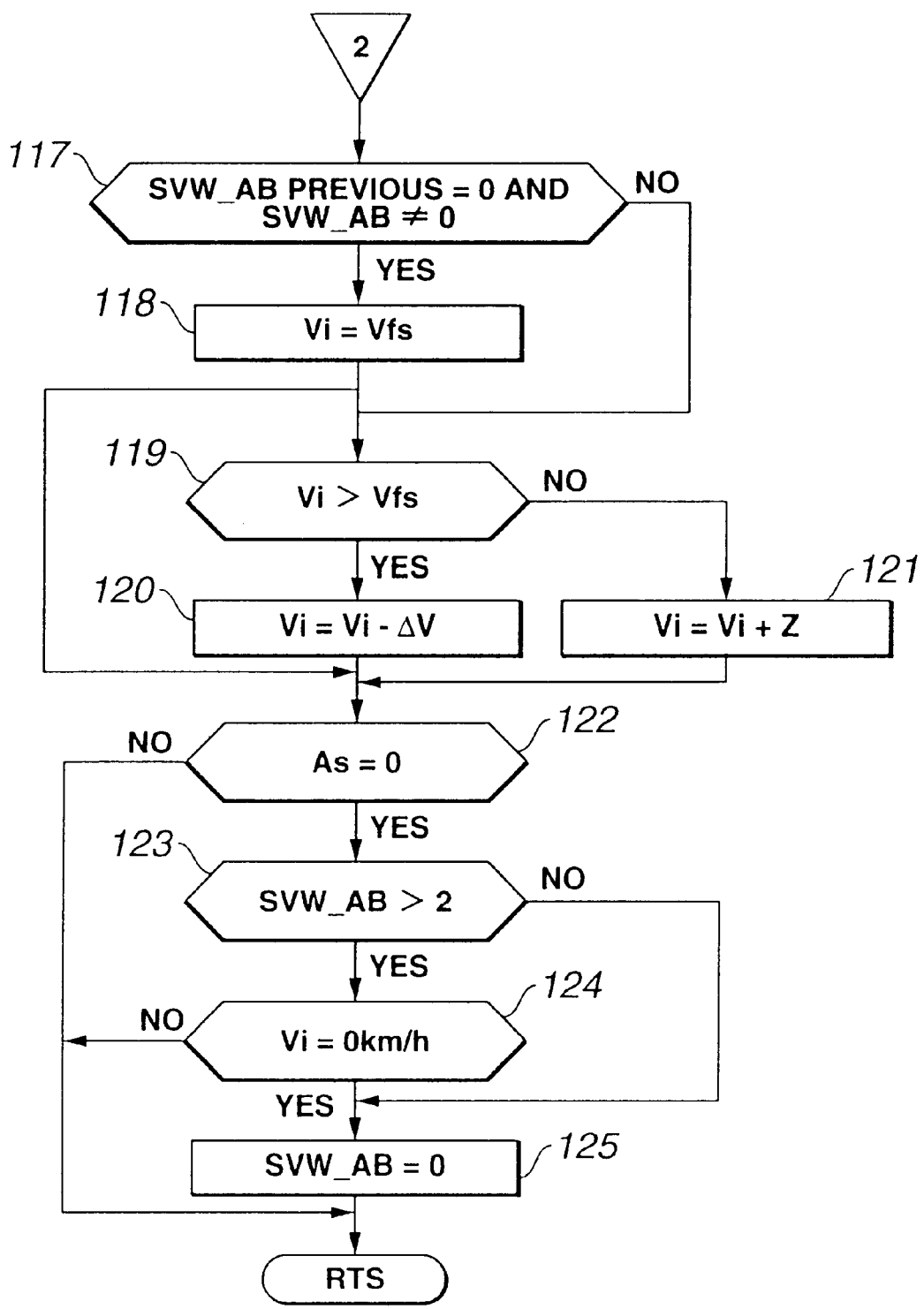
FIG. 7 is a flow chart illustrating a third section of the process of calculating the pseudo vehicle body speed in the brake control system of the embodiment.

Then, at step 117 shown in FIG. 7, whether or not the abnormality concluding signal SVW_AB was not produced at the previous control timing but it is produced at the current control timing, is determined. In this example, the answer of step 117 is affirmative if the previous value of SVW_AB is equal to 0 and the current value of SVW_AB is not equal to zero. If the abnormality concluding signal SVW_AB is produced at first at this current timing, and the answer of step 117 is YES, then the control unit 12 proceeds to step 118, and sets the select vehicle speed Vfs to the pseudo vehicle body speed Vi (Vi=Vfs). If the abnormality concluding signal SVW_AB is not at first produced at this control timing in the determination at step 117 (the answer of step 117 is NO), the control unit 12 proceeds from step 117 directly to step 119. At step 119 reached after step 118 or step 117, whether the pseudo vehicle speed Vi is greater than the select vehicle speed Vfs or not is determined. If Vi>Vfs, the wheel speed is decelerated, and then at step 120, the pseudo vehicle speed Vi is set as Vi=Vi−ΔAV. It is noted that ΔV is an estimated value of the vehicle deceleration, estimated from the rate of change4 of the pseudo vehicle speed Vi. If Vi<Vfs and the answer of step 119 is negative, the wheel speed is on recovery, and accordingly, the pseudo vehicle speed Vi is determined by Vi+z where z is a preset acceleration limiter value (Vi=Vi+z).

At step 122, it is determined whether the On-ABS signal AS is zero or not, that is, whether the elapsed time from the execution of the pressure reducing control exceeds the preset time (150) or not. If it does not exceed the set value (AS≈0), the control 12 terminates the calculation of the pseudo vehicle speed. If AS=0, the control unit 12 proceeds from step 122 to step 123, and examines whether the abnormal wheel suffering the abnormal wheel speed is a drive wheel by examining whether the abnormality concluding signal SVW_AB is greater than 2. If it is a drive wheel (rear wheel) (SVW_AB>2), the control unit 12 proceeds from step 123 to step 125, and resets the abnormality concluding signal SVW_AB to zero at step 125, and thereafter, terminates the calculation of the pseudo vehicle speed. If the abnormal wheel suffering the abnormal wheel speed is a non-drive wheel (front wheel), the control unit 12 proceeds from step 123 to step 123, and examines whether the pseudo vehicle speed Vi is equal to 0 Km/h or not. If Vi=0 Km/h, the control unit 12 proceeds to step 125, and resets SVW_AB to zero. If Vi≈0 Km/h, the control unit 12 terminates the process of calculating the pseudo vehicle speed.

Next, explanation will be made of the operation of this embodiment.

At first, operation when an output from the wheel sensor 13 of a non-drive wheel is abnormal will be explained.

Figure 8:
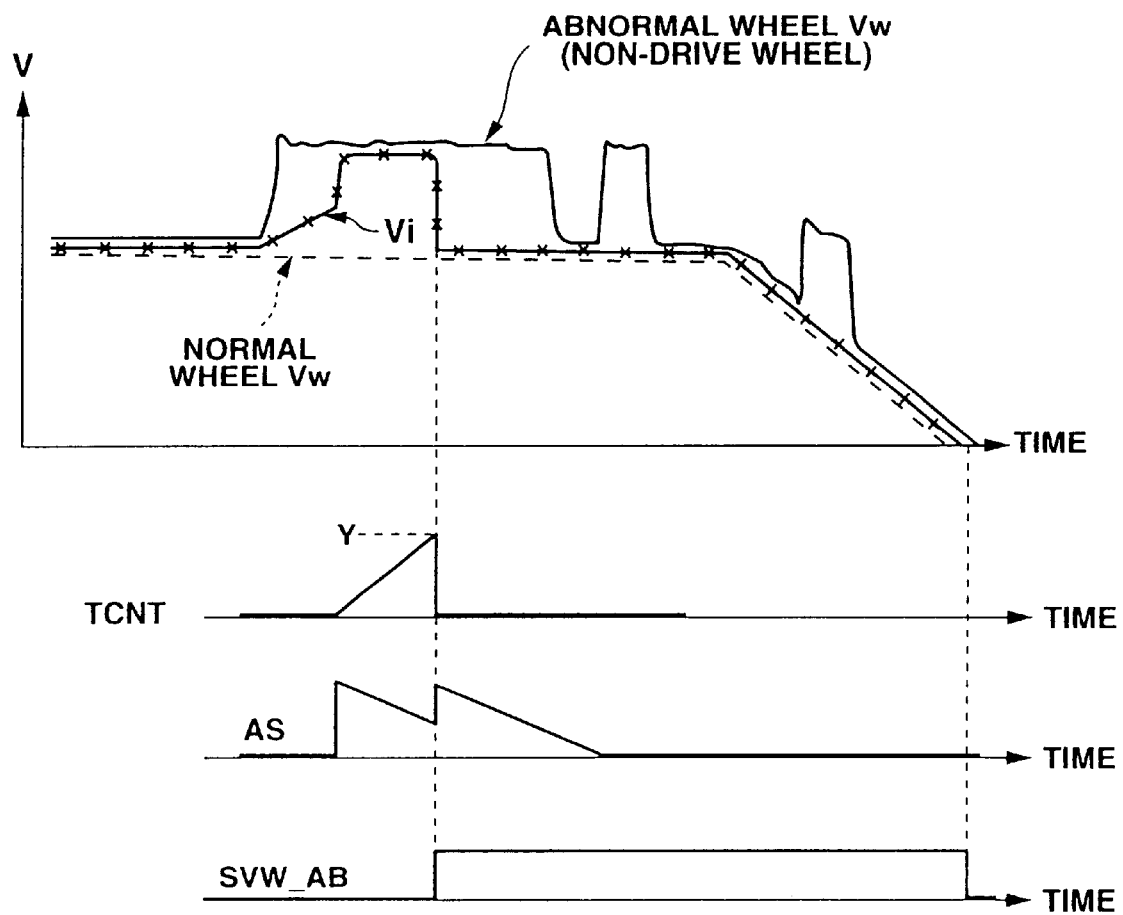
FIG. 8 is a time chart showing operations upon occurrence of an abnormality of a driven wheel in the brake control system of the embodiment.

FIG. 8 shows such a condition that a wheel speed Vw of the non-drive (driven) wheel becomes high due to imposed noise during braking from a constant speed running condition.

In this figure, when one of the wheel speeds Vw is abruptly increased during constant speed running, the select wheel speed VFs is obtained from the highest one Vw among the wheel speeds of the four wheels through the steps 114 to 116, that is, it is obtained from the wheel speed Vw of an abnormal wheel until the count value on the counter TCNT exceeds the abnormality determining time through the steps 109 to 110. As a result, the pseudo vehicle body speed Vi is once increased following the wheel speed of the abnormal wheel.

Thus, the wheel speeds Vw of the normal wheels are decreased to be smaller than the pseudo vehicle speed Vi by a large degree, and as a result, the pressure reducing control is executed for the normal wheels so as to produce the On-ABS control signal AS. It is noted that the driver does not carry out braking at this time, and accordingly, since the pressure in the wheel cylinders is still maintained to be the atmospheric pressure, and accordingly, the running condition will not vary.

Thereafter, after the abnormality determining time Y elapses, the abnormality concluding signal SVW_AB is set to 1 or 2 by the flow through steps 112 to 113, and the select wheel speed Vfs is obtained from the third higher wheel speed Vw, that is, a wheel speed Vw which is highest among the normal wheels. As a result, no pressure reducing control is carried out, and accordingly, an ABS on-control signal AS is delivered as shown until the count (150) is completed.

When the driven wheel is abnormal as mentioned above, that is, when the abnormal concluding signal SVW_AB is equal to 1 or 2, the flow of control is through steps 122, 123, 124, RTS, and the abnormality concluding signal SVW_AB is not set to zero until AS =0 and Vi=0 are obtained. Thus, if the braking as shown is carried out, the pseudo vehicle body speed Vi is still obtained from the third wheel speed Vw, and as shown, even though the wheel speed Vw of the abnormal wheel is abruptly increased, no ABS control is carried out.

Next, operation in such a case that an output of a wheel speed sensor 13 for a drive wheel becomes abnormal, will be explained in detail.

a) During Non-ABS Control

If an output of a wheel speed sensor 13 for a drive wheel becomes higher during non-ABS control, operation similar to the operation in the case of occurrence of abnormity in a non-drive wheel. However, in this case, since a rear wheel is abnormal, the abnormality concluding signal SVW_AS is set to 3 or 4. In this case, as shown in FIG. 8, when the counting is carried out until the On-ABS control signal AS becomes zero, the flow is through the steps 122, 123 and 125, and at the time when AS becomes equal to 0, the abnormality concluding signal SVW_AB becomes equal to zero.

b) During ABS Control

Figure 9:
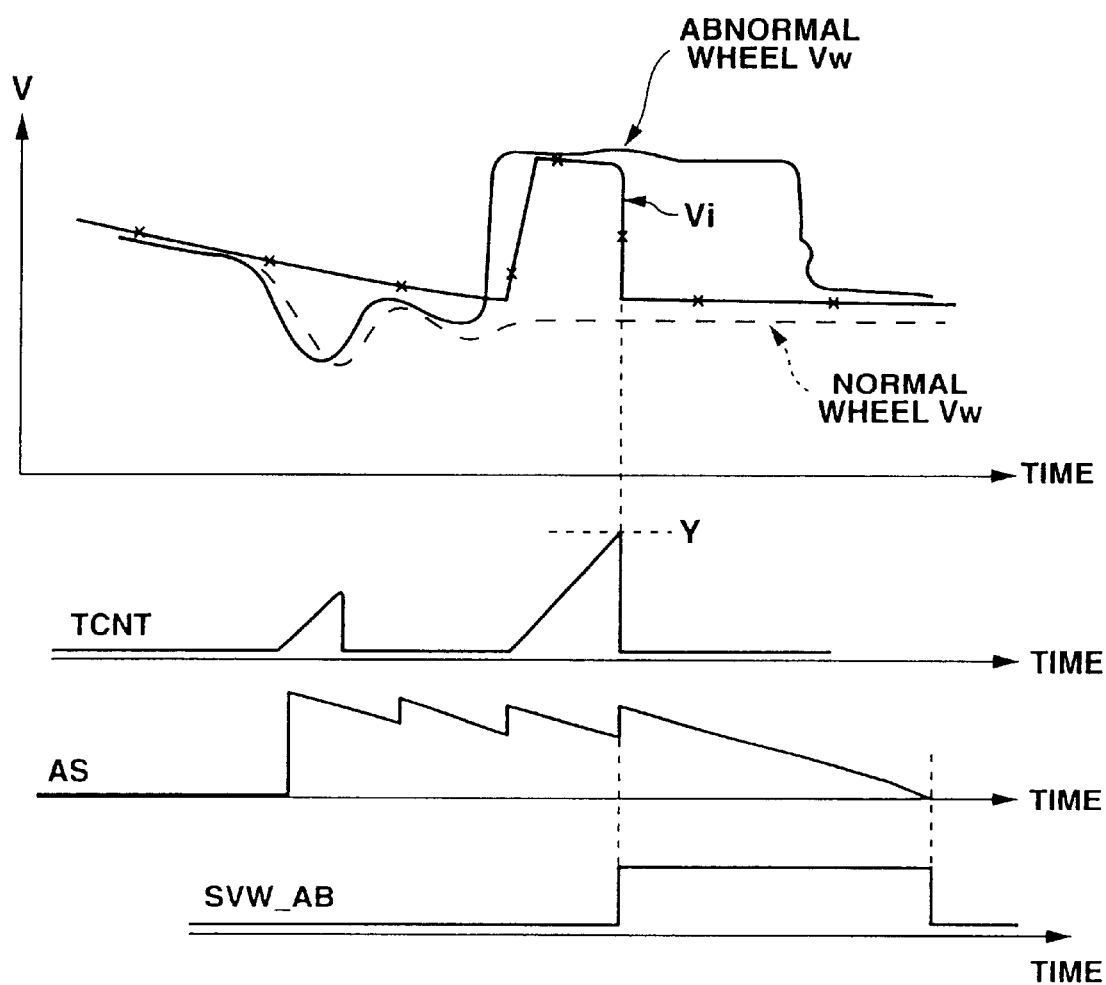
FIG. 9 is a time chart showing operations upon occurrence of an abnormality of a drive wheel in the brake control system of the embodiment.

FIG. 9 shows such a case that the wheel speed Vw of a drive wheel is abruptly increased during ABS control. In this example, as a result of abrupt decrease of the wheel speed upon braking, the execution of the ABS control is started, and as the pressure is reduced, the wheel speed Vw of the drive wheel is sharply increased after the delivery of the On-ABS control signals AS is initiated.

In this case, since the abnormality concluding signal SVW_AB is zero from the abrupt increase of the wheel speed Vw until the counter TCNT exceeds the abnormality determining time Y, at step 116, the select wheel speed Vfs is obtained from the maximum value among the four wheels, and as a result, as shown, the pseudo vehicle speed Vi is increased.

When the pseudo vehicle speed Vi is increased as mentioned above, the wheel speeds Vw of the normal wheels are greatly lowered. As a result, the pressure reducing operation for the normal wheels is repeated, and the wheel speeds Vw of the normal wheels are flattened as shown in the figure.

Thereafter, if the condition of the abnormally increased wheel speed Vw being greater than the sum obtained by adding the abnormality determining speed difference x (which is equal to Vi=1.05+4 km/h, for example) to the pseudo vehicle speed Vi continues for a time exceeding the abnormality determining time Y (for example, 500 ms~60000 ms), then the abnormality concluding signal SVW_AB becomes 3 or 4 which indicates a drive wheel, and as a result, the steps 114 to 115 are carried out so that the select wheel speed Vfs is determined by the maximum wheel speed 3rdVw among the normal three wheels. Accordingly, the pseudo vehicle speed Vi is determined from the select wheel speed Vfs by the flow through the steps 117 to 118, and as a result, the pseudo vehicle body speed Vi is lowered to a level equal to the normal wheel speed Vw.

Thus, the pseudo vehicle body speed is determined from the wheel speeds of the wheels excluding the abnormal wheel, and accordingly, a difference between the pseudo vehicle body speed Vi and the normal wheel speed Vw becomes smaller, thus no pressure reduction is made. As a result, the counting of the On-ABS control signal AS is continued, and if this count value exceeds the predetermined value (150) so as to be AS=0, the steps 122, 123 and 125 are carried out since the abnormal wheel is a drive wheel. Thus, the abnormality concluding signal SVW_AB is set to be zero at step 125.

Thus, if the wheel speed of this drive wheel is merely due to a drive wheel slip, as shown, at the time when the abnormality concluding signal SVW_AB becomes zero, the drive wheel slip is ended, and accordingly, since the abnormality concluding signal SVW_AB becomes zero, at step 116, the pseudo vehicle body speed Vi can be normally obtained even though the process of obtaining the pseudo vehicle speed Vi from the four normal wheels is resumed.

As mentioned above, in this embodiment, if the output of at least one wheel speed sensor 13 becomes abnormal, whether the abnormal wheel is a drive wheel or a driven wheel is determined, and if the driven wheel is abnormal, the abnormality concluding signal SVW_AB is held to be not zero. If, on the other hand, the abnormal wheel is one of the drive wheels, the abnormality concluding signal VSW_AB is changed over into zero as the On-ABS control signal SVW_AB becomes zero. Thus, if a driven wheel becomes abnormal, the condition in which the pseudo vehicle speed Vi is obtained from the wheel speeds Vw of normal wheels without adding the vehicle speed Vw of the abnormal wheel thereto, is held for a longer time, and accordingly, unnecessary pressure reduction can be prevented without the pseudo vehicle speed Vi following the wheel speed of the abnormal wheel. Meanwhile, if a drive wheel is abnormal, the abnormality concluding signal VSW_AB is again set to zero when a predetermined value (150) is counted after the final pressure reduction is started. With this arrangement, if the output value is instantly high extraordinarily due to a wheel spin in the case of the drive wheel, the normal control is again carried out without treating this condition as being abnormal, thereby it is possible to prevent occurrence of erroneous operation caused by a spin of a drive wheel.

Although the explanation has been made of the embodiment with reference to the drawing, the present invention is not limited to this embodiment.

For example, referring to FIG. 2, the pressure in the wheel cylinder 3 is reduced, and held and increased by using only one selector valve 5. However, instead of the selector valve 5 shown in FIG. 2, it is optional to employ a normally open two-position inflow valve which can be changed over between two position, and which can open and close the brake circuit 2, and a normally closed two-position outflow valve which can open and close the drain circuit 4.

As mentioned above, according to the invention, it is possible to optimize the reset condition in accordance with a kind of an abnormal wheel, and thereby to enhance the control quality.

Further, if a drive wheel is abnormal, the determination of abnormality is reset after completion of the ABS control, and accordingly, even though a drive wheel slip is the cause of the abnormality, the pseudo vehicle speed producing means can resume the normal calculation of the normal pseudo vehicle body speed at the end of the wheel spin. Thereby, the control system according to the present invention can enhance the control quality without causing erroneous determination due to a spin of a drive wheel, and erroneous control due to this erroneous determination.

Further, if a non-drive (driven) wheel is abnormal, the determination of abnormality is reset when two conditions, that is, completion of the ABS control, and the pseudo vehicle body speed of 0 Km/h are satisfied. Thus, even though an abnormal signal for a driven wheel is repeatedly produced, this abnormality does not affect the production of the pseudo vehicle body speed.

In the illustrated embodiment, a brake control system includes sections as shown in FIG. 1. A brake unit 100b is a section for decreasing a brake hydraulic pressure in at least one of wheel cylinders 100a. Wheel speed sensors 100c are devices for detecting rotational speeds of the wheels. A pseudo vehicle body speed producing section 100d is a section for determining a pseudo vehicle body speed in accordance with outputs from the wheel speed sensors 100c. An ABS control section 100e is a section for carrying out the ABS control to decrease the brake hydraulic pressure according to the need with the brake unit 100b in accordance with a difference between the pseudo vehicle body speed and each of the wheel speeds so as to prevent wheel locking upon braking. An abnormality determining section 100f is a section for causing the pseudo vehicle speed producing means 100d to determine the pseudo vehicle body speed in accordance with outputs from those of the vehicle speed sensors which exclude the one for a wheel with which an abnormality occurs. The abnormality determining section 100f includes at least an abnormal wheel discriminating section 100g for determining whether the wheel that is determined as being abnormal is a drive wheel or a driven wheel. The abnormality determining section 100f is arranged to differentiate the term for resetting determination of an abnormality depending upon whether the abnormal wheel is a drive wheel or a driven wheel.

It is possible to calculate wheel speed ratios among the wheel speeds and to judge that there exists an abnormality if one of the wheel speed ratios continues to be greater than a predetermined value for a predetermined period.

We claim:

1. A brake control system comprising:
   a brake unit for reducing brake hydraulic pressures in wheel cylinders for braking wheels of a vehicle, independent from one another;
   wheel speed sensors for detecting wheels speeds of the wheels, respectively;
   pseudo vehicle body speed producing means for determining a pseudo vehicle body speed in accordance with outputs of the wheel speed sensors;
   ABS control means for carrying out ABS control to prevent wheel locking on braking by decreasing a brake hydraulic pressure with the brake unit in accordance with a difference between the pseudo vehicle body speed and each of the wheel speeds; and
   abnormality determining means for detecting an abnormality in the outputs of the wheel speed sensors, and for causing the pseudo vehicle body speed producing means to determine the pseudo vehicle body speed in accordance with the outputs from the wheel speed sensors, excepting the output of the wheel speed sensor if an abnormality is detected therein;
   the abnormality determining means comprising an abnormal wheel discriminating means for determining whether an abnormal wheel is a drive wheel or not, to differentiate conditions for resetting the determination of abnormality in dependence on whether the abnormal wheel is a drive wheel or a non-drive wheel.

2. A brake control system comprising:
   a brake unit for reducing brake hydraulic pressures in wheel cylinders for braking wheels of a vehicle, independent from one another;
   wheel speed sensors for detecting wheels speeds of the wheels, respectively;
   pseudo vehicle body speed producing means for determining a pseudo vehicle body speed in accordance with outputs of the wheel speed sensors;
   ABS control means for carrying out ABS control to prevent wheel locking on braking by decreasing a brake hydraulic pressure with the brake unit in accordance with a difference between the pseudo vehicle body speed and each of the wheel speeds; and
   abnormality determining means for detecting an abnormality in the outputs of the wheel speed sensors, and for causing the pseudo vehicle body speed producing means to determine the pseudo vehicle body speed in accordance with the outputs from the wheel speed sensors, excepting the output of the wheel speed sensor if an abnormality is detected therein;
   the abnormality determining means comprising an abnormal wheel discriminating means for determining whether an abnormal wheel is a drive wheel or not, to differentiate conditions for resetting the determination of abnormality in dependence on whether the abnormal wheel is a drive wheel or a non-drive wheel; and
   wherein said abnormality determining means resets the determination of abnormality on completion of the ABS control if the abnormal wheel is a drive wheel.

3. A brake control system as set forth in claim 9, wherein, if the abnormal wheel is a non-drive wheel, said abnormality determining means resets the determination of abnormality when first and second conditions are satisfied, the first condition being satisfied when the ABS control is completed, the second condition being satisfied when the pseudo vehicle body speed is equal to 0 Km/h.

4. A brake control system as set forth in claim 2, wherein the ABS control means terminates the ABS control when an elapsed time from the execution of a final pressure reducing operation exceeds a predetermined time.

5. A brake control system comprising:
   a brake unit for reducing brake hydraulic pressures in wheel cylinders for braking wheels of a vehicle, independent from one another;
   wheel speed sensors for detecting wheels speeds of the wheels, respectively;
   pseudo vehicle body speed producing means for determining a pseudo vehicle body speed in accordance with outputs of the wheel speed sensors;
   ABS control means for carrying out ABS control to prevent wheel locking on braking by decreasing a brake hydraulic pressure with the brake unit in accordance with a difference between the pseudo vehicle body speed and each of the wheel speeds; and
   abnormality determining means for detecting an abnormality in the outputs of the wheel speed sensors, and for causing the pseudo vehicle body speed producing means to determine the pseudo vehicle body speed in accordance with the outputs from the wheel speed sensors, excepting the output of the wheel speed sensor if an abnormality is detected therein;
   the abnormality determining means comprising an abnormal wheel discriminating means for determining whether an abnormal wheel is a drive wheel or not, to differentiate conditions for resetting the determination of abnormality in dependence on whether the abnormal wheel is a drive wheel or a non-drive wheel; and
   wherein said pseudo vehicle speed producing means selects, as a select wheel speed, a highest wheel speed among the wheel speeds of the four wheels and determines the pseudo vehicle body speed in accordance with the select wheel speed when an abnormality is not detected, and said pseudo vehicle speed producing means selects, as the select wheel speed, a highest wheel speed among the wheel speeds of the wheels excluding the abnormal wheel which is a wheel determined as being abnormal and determines the pseudo vehicle body speed in accordance with the select wheel speed when an abnormality is detected.

6. A brake control system comprising:
   a brake unit for reducing brake hydraulic pressures in wheel cylinders for braking wheels of a vehicle, independent from one another;
   wheel speed sensors for detecting wheels speeds of the wheels, respectively;
   pseudo vehicle body speed producing means for determining a pseudo vehicle body speed in accordance with outputs of the wheel speed sensors;

ABS control means for carrying out ABS control to prevent wheel locking on braking by decreasing a brake hydraulic pressure with the brake unit in accordance with a difference between the pseudo vehicle body speed and each of the wheel speeds; and abnormality determining means for detecting an abnormality in the outputs of the wheel speed sensors, and for causing the pseudo vehicle body speed producing means to determine the pseudo vehicle body speed in accordance with the outputs from the wheel speed sensors, excepting the output of the wheel speed sensor if an abnormality is detected therein;

the abnormality determining means comprising an abnormal wheel discriminating means for determining whether an abnormal wheel is a drive wheel or not, to differentiate conditions for resetting the determination of abnormality in dependence on whether the abnormal wheel is a drive wheel or a non-drive wheel; and wherein said abnormality determining means determines that there is an abnormality when one of the wheel speeds becomes greater than the pseudo vehicle body speed by an amount exceeding a predetermined value.

7. A brake system for a vehicle, comprising:

a brake unit for decreasing brake fluid pressures to wheel cylinders for wheels of the vehicle individually;

wheel speed sensors for sensing wheel speeds of the wheels of the vehicle; and a controller:

calculating a pseudo vehicle body speed in accordance with the wheel speeds, decreasing the brake fluid pressure for each wheel in accordance with a difference between the pseudo vehicle body speed and the wheel speed of that wheel to prevent wheel locking during deceleration, judging one of the sensed wheel speed to be an abnormal wheel speed if the one of the sensed wheel speeds satisfies a predetermined condition to discriminate an abnormality, calculating the pseudo vehicle body speed by excepting the abnormal wheel speed if one of the sensed wheel speeds is judged to be the abnormal wheel speed, determining whether the wheel whose speed is judged to be the abnormal wheel speed is a drive wheel or a non-drive wheel of the vehicle, resetting the judgment of judging the abnormal wheel speed under a first condition if the wheel whose speed is judged to be the abnormal wheel speed is a drive wheel, and under a second condition if the wheel whose speed is judged to be the abnormal wheel speed is a non-drive wheel, and resetting the judgement of abnormality on completion of the ABS control if the abnormal wheel is a drive wheel.

8. A brake control process for a vehicle, comprising:

judging one of sensed wheel speeds to be an abnormal wheel speed if the one of the sensed wheel speeds satisfies a predetermined condition to discriminate an abnormality, calculating the pseudo vehicle body speed by excepting the abnormal wheel speed if one of the sensed wheel speeds is judged to be the abnormal wheel speed, determining whether the wheel whose speed is judged to be the abnormal wheel speed is a drive wheel or a non-drive wheel of the vehicle, and resetting the judgment of judging the abnormal wheel speed under a first condition if the wheel whose speed is judged to be the abnormal wheel speed is a drive wheel, and under a second condition distinct from the first condition if the wheel whose speed is judged to be the abnormal wheel speed is a non-drive wheel. and resetting the judgement of abnormality on completion of the ABS control if the abnormal wheel is a drive wheel.

9. A brake control system comprising:

a brake unit for reducing brake hydraulic pressures in wheel cylinders for braking wheels of a vehicle, independent from one another;

wheel speed sensors for detecting wheels speeds of the wheels, respectively;

pseudo vehicle body speed producing means for determining a pseudo vehicle body speed in accordance with outputs of the wheel speed sensors;

ABS control means for carrying out ABS control to prevent wheel locking on braking by decreasing a brake hydraulic pressure with the brake unit in accordance with a difference between the pseudo vehicle body speed and each of the wheel speeds; and abnormality determining means for detecting an abnormality in the outputs of the wheel speed sensors, and for causing the pseudo vehicle body speed producing means to determine the pseudo vehicle body speed in accordance with the outputs from the wheel speed sensors, excepting the output of the wheel speed sensor if an abnormality is detected therein;

the abnormality determining means comprising an abnormal wheel discriminating means for determining whether an abnormal wheel is a drive wheel or not, to differentiate conditions for resetting the determination of abnormality in dependence on whether the abnormal wheel is a drive wheel or a non-drive wheel; and wherein said abnormality determining means resets the determination of abnormality when a first condition is fulfilled if the abnormal wheel is a drive wheel, whereas said abnormality determining means resets the determination of abnormality when the first condition and a second condition are both fulfilled if the abnormal wheel is a non-drive wheel.

10. A brake control system as set forth in claim 2, wherein, if the abnormal wheel is a non-drive wheel, said abnormality determining means resets the determination of abnormality when first and second conditions are satisfied, the first condition being satisfied when the ABS control is completed, the second condition being satisfied when the pseudo vehicle body speed is equal to 0 Km/h.

11. A brake control system as set forth in claim 2, wherein the ABS control means terminates the ABS control when an elapsed time from the execution of a final pressure reducing operation exceeds a predetermined time.

12. A brake control system as set forth in claim 3, wherein the ABS control means terminates the ABS control when an elapsed time from the execution of a final pressure reducing operation exceeds a predetermined time.

13. A brake control system as set forth in claim 7, wherein said abnormality determining means resets the determination of abnormality on completion of the ABS control if the abnormal wheel is a drive wheel.

14. A brake control system as set forth in claim 7, wherein, if the abnormal wheel is a non-drive wheel, said abnormality determining means resets the determination of abnormality when first and second conditions are satisfied, the first condition being satisfied when the ABS control is completed, the second condition being satisfied when the pseudo vehicle body speed is equal to 0 Km/h.

15. A brake control system as set forth in claim 8, wherein said abnormality determining means resets the determination of abnormality on completion of the ABS control if the abnormal wheel is a drive wheel.

16. A brake control system as set forth in claim 8, wherein, if the abnormal wheel is a non-drive wheel, said abnormality determining means resets the determination of abnormality when first and second conditions are satisfied, the first condition being satisfied when the ABS control is completed, the second condition being satisfied when the pseudo vehicle body speed is equal to 0 Km/h.

* * * * *